TUNNEL DIODE DETECTOR FOR FREQUENCY MODULATED SIGNALS

Filed July 13, 1961

Inventors:
Robert L. Watters;
Harwood B. Moore,
by Joseph V. Claeys
Their Attorney.

3,206,690
TUNNEL DIODE DETECTOR FOR FREQUENCY MODULATED SIGNALS

Robert L. Watters, Schenectady, and Harwood B. Moore, Sauquoit, N.Y., assignors to General Electric Company, a corporation of New York Filed July 13, 1961, Ser. No. 123,731
12 Claims. (Cl. 329—119)

Figures 1, 2, 3:
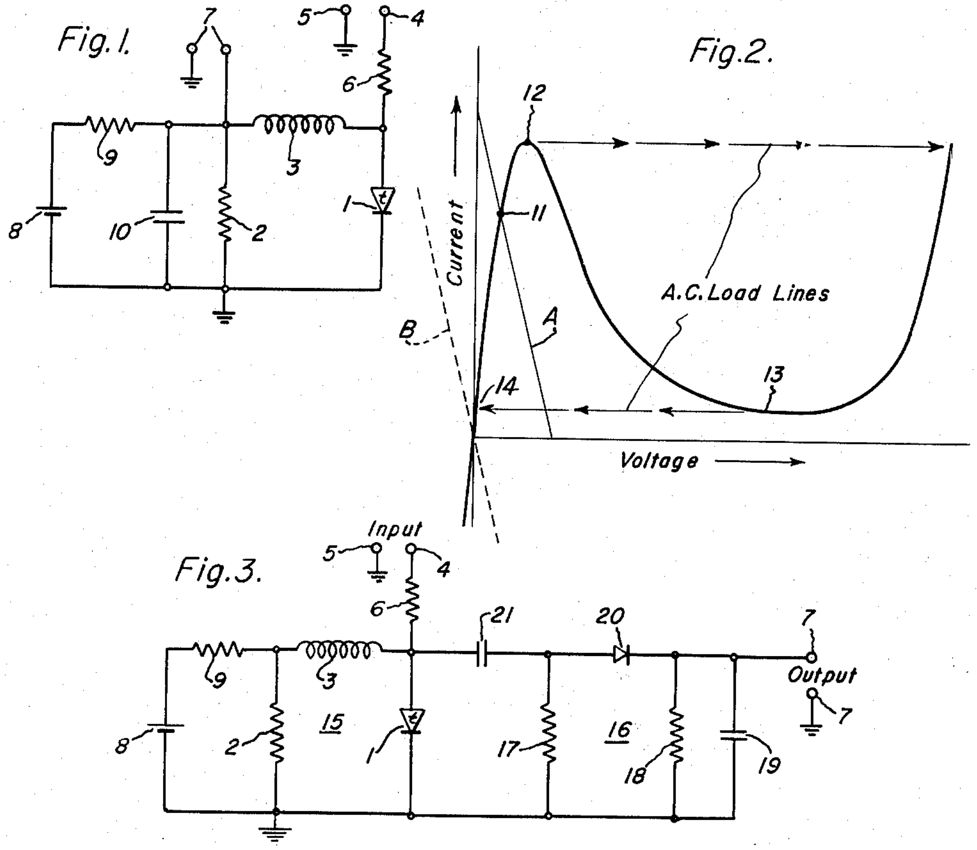

This invention relates in general to communication circuits and in particular to new and improved frequency modulation detectors utilizing tunnel diode devices.

Detection, often referred to in the art as demodulation, is the recover of transmitted intelligence from a modulated wave. For amplitude modulated waves this is accomplished by simply rectifying the wave to obtain a pulsating direct current which varies in amplitude in accordance with the modulation that carries the intelligence. The detection of frequency modulated signals, however, has usually employed a method of distorting the frequency spectrum of the wave in a manner that causes the envelope amplitude to fluctuate in accordance with the intelligence; the resulting wave being then rectified to obtain such intelligence. The most widely used circuit arrangements for detecting frequency modulated signals are more commonly known as "discriminators," as for example, the "Foster-Seeley" and "Ratio Detector" circuits. Circuit arrangements of this type are quite satisfactory for a great many applications and provide nearly distortionless detection of frequency modulated signals over a wide range of frequencies. Such arrangements, however, require a variety of circuit components and are relatively complex.

In the field of electronics, and more particularly in radio communication applications there is a continuing need to provide for the detection of frequency modulated signals in as simple a manner as possible. Further, it is highly desirable for a great many current and future applications to provide such circuit arrangements which lend themselves to compactness and miniaturization.

It is a broad object of this invention, therefore, to provide for the detection of frequency modulated signals in as simple a manner as possible.

It is another object of this invention to provide a simple and compact frequency modulation detector which is inexpensive, simple, and low power consuming.

It is a further object of this invention to provide a detector of frequency modulated signals which lends itself to compactness and miniaturization.

It is a still further object of this invention to provide a new and improved form of frequency modulation detector and more specifically to provide a low power consuming circuit arrangement utilizing a single tunnel diode device as the active circuit element therein which makes it possible to obtain an audio signal directly from the output thereof in response to an applied frequency modulated input signal.

Briefly stated, in accordance with one aspect of this invention, a new and improved detector of frequency modulated signals comprises a tunnel diode device which exhibits a region of negative resistance in the low forward voltage range of its current voltage characteristic. Means are provided for coupling a frequency modulated input signal to the tunnel diode device which causes a change thereof from one operating region of its characteristic to another, thereby producing an output thereacross.

In one specific embodiment of this invention the average output across the tunnel diode device varies with the frequency of the applied input signal and in another specific embodiment the average output across the tunnel diode device is independent of the frequency of the applied input signal. In the first specific embodiment, therefore, the intelligence from the frequency modulated signal is obtained by providing further means coupled to the tunnel diode device for average the output thereof. In the other embodiment, on the other hand, further means are provided, coupled to the tunnel diode device, for respectively differentiating, rectifying and then averaging the output thereacross.

Figure 4:
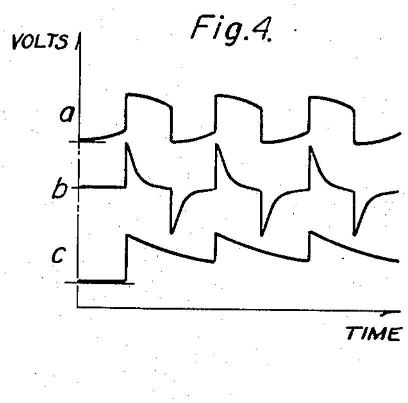
Figure 5:
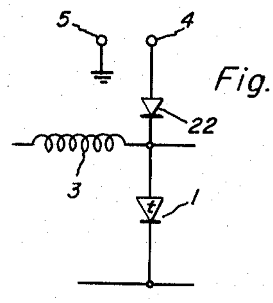

The novel features of our invention which are believed characteristic are set forth with particularity in the appended claims. Our invention itself, however, both as to its organization and method of operation together with further objects and advantages thereof may best be understood by reference to the following description taken in conjunction with the accompanying drawing wherein like reference numerals indicate similar components and in which:

FIG. 1 is a schematic diagram of a basic circuit arrangement in accordance with one embodiment of this invention, FIG. 2 is a typical current-voltage characteristic of a tunnel diode device of the type suitable for use in the practice of this invention showing typical direct current and alternating current load lines thereon, FIG. 3 is a schematic circuit diagram of a frequency modulation detector in accordance with another embodiment of this invention, FIG. 4 illustrates the waveforms produced by the circuit of FIG. 3 at specified points therein; and, FIG. 5 illustrates another embodiment of this invention employing means for providing still greater reliability.

In FIG. 1 there is shown a schematic circuit diagram of a basic arrangement for the simple and effective detection of frequency modulated signals in accordance with one embdiment of this invention. In FIG. 1 there is shown a "pi" type network wherein the shunt elements are a tunnel diode device 1 and a resistance 2 having a common connection to a source of reference potential, such as ground; the series element of the "pi" section being an inductance 3. Input terminals 4–5 are provided for coupling a frequency modulated input signal through an appropriate impedance shown conveniently as resistance 6 to tunnel diode device 1. An output is taken across resistance 2 by means of output terminals 7—7.

The above are all the components required for the basic frequency modulation detector of this invention, however, for greater dependability of operation under varying signal conditions and especially for low signal applications, it may be necessary to provide for a steady state forward bias for the tunnel diode device.

While various bias arrangements well-known in the art are suitable, a simple battery 8, resistance 9 and by-pass capacitance 10 combination co-operating with resistance 2 are shown for simplicity of explanation. The slope of the direct current load line for the circuit of FIG. 1 is determined essentially by the value of resistance 2, however, its intersection with the tunnel diode current-voltage characteristic depends upon the voltage applied thereto. For example, resistance 2 serves as a load on the negative resistance of tunnel diode device 1 and should have a value to establish a direct current load line having a single intersection with the tunnel diode current-voltage characteristic to assure that the tunnel diode device does not switch between stable operating conditions. Capacitance 10 serves as a by-pass.

The application of an input signal at input terminals 4 and 5 applies a voltage across the tunnel diode device. When this voltage is greater than that corresponding to the peak current thereof the tunnel diode is caused to abruptly change to a higher voltage operating region. The $L/R$ time constant allows the tunnel diode to return to its original operating region and is such that the average output appearing at the terminals 7—7 varies in accordance with the frequency of the applied input signal.

The operation of the circuit arrangement of FIG. 1 may be explained in still more detail by reference to the tunnel diode current-voltage characteristic shown in FIG. 2. In FIG. 2 there is shown a suitable direct current load line A established by the above described bias means including battery 8, resistances 2 and 9 respectively, and by-pass capacitance 10. As described above, the slope of this direct current load line is essentially determined by the value of the resistance 2, while its intersection with the characteristic depends upon the voltage appearing across the tunnel diode device.

Assume initially, that the frequency modulated input signal is relatively large so that a steady state bias is not required. Under such a condition, in the absence of an input signal, there is no voltage across the tunnel diode device and the intersection of the direct current load line with the tunnel diode current-voltage characteristic passes through the origin as shown by the broken line B in FIG. 2, the slope of the load line being essentially determined by the value of resistance 2 as stated above.

For the polarity connection shown in FIG. 1 the positive portion of the applied input signal causes the voltage across the tunnel diode device to increase in its forward direction accordingly. For example, the tunnel diode operating point is caused to move upward toward the point 12. Upon reaching the point 12, however, any further increase in voltage causes the tunnel diode device to abruptly switch to a higher voltage operating region, as shown by the arrows representing the alternating current load line. Such switching is due to the fact that the alternating current load line is not stable in the negative resistance region.

As the voltage of a positive half cycle of the input signal reaches its peak and begins to decrease, it is required that the voltage across the tunnel diode device be reduced. This reduction requires some time because of the action of inductance 3 in resisting any change in current, as required by the characteristic curve of the tunnel diode device and the changing position of the alternating current load line. Eventually, a position on the tunnel diode operating characteristic is reached, such as near the region 13, where a further reduction in voltage can only be accomplished by a switching action along the now-lowered alternating current load line to the region 14 and thence down the characteristic as the signal voltage becomes smaller and finally begins, and completes, its negative half cycle.

The values of the resistance 2 and the inductance 3 may be so selected to provide an $L/R$ time constant such that a new cycle of operation of the tunnel diode device begins for each positive half cycle of the input signal. The output waveform across the tunnel diode device, therefore, is a series of relatively short positive pulses. Since the cycle of operation of the tunnel diode device is initiated by only positive half cycles of the input signal and allowed to return to its original operating region by the $L/R$ time constant, the average value of the output across the tunnel diode device varies with the frequency of the applied input signal. This average output appears across resistance 2 and represents the intelligence of the frequency modulated input signal. For example, an audio frequency output may be obtained at the terminals 7—7 from an appropriate frequency modulated input signal at the terminals 4–5.

While the operation of the embodiment of our invention shown in FIG. 1 has been described with reference to an $L/R$ time constant which provides that a new cycle of operation of the tunnel diode device be initiated by each cycle of the input signal, it is to be understood that in this respect the values of resistance 2 and inductance 3 may be chosen over a wide range of values with respect to the frequency of the input signal which will provide that the average output across the tunnel diode device varies with the frequency of the input signal and it is, therefore, not required that such tunnel diode operating cycle be initiated at each cycle of the input signal. It is to be further understood that although the above description was with reference to the particular polarity connection for tunnel diode device 1 wherein the cycle is initiated by a positive half cycle of the input signal, for the opposite polarity connection thereof the cycle of operation is similarly initiated by the negative half cycle of the input signal.

For smaller operating input signal levels it is preferred to use a steady state bias as described hereinbefore. Such a steady state bias provides a static operating point at a position of the characteristic which assures that the voltage corresponding to the point 12 (the tunnel diode peak current) is exceeded by the application of such input signal. For example, in FIG. 2 with a steady state bias applied from a bias means such as battery 8, resistance 9, and by-pass capacitance 10, a typical direct current load line may be located such as shown at A. It will be evident from the figure, therefore, that the voltage corresponding to the point 12 is exceeded by a much smaller signal than would be the case for operation without steady state bias, such as for the load line B.

With such a bias means, an average operating point may be also selected in the negative resistance region of the tunnel diode current-voltage characteristic if desired. For this bias condition the circuit operation is essentially similar, except that it appears substantially as a free running relaxation type oscillator which is synchronized by the frequency modulated input signal. As the frequency of the input is increased, the output pulses across the tunnel diode occur at a faster rate and essentially of constant length so that the average current flowing to the tunnel diode device is increased. This average output, as before, represents the intelligence of the modulated input signal.

In FIG. 3 there is shown a schematic circuit diagram of a detector of frequency modulated signals in accordance with another specific embodiment of this invention wherein the average output of the tunnel diode device is independent of the frequency of the applied input signal and wherein any difficulties due to amplitude modulation are avoided.

In FIG. 3 there is shown two "pi" sections, indicated generally at 15 and 16 respectively, having a common connection to a source of reference potential, such as ground. Thet shunt elements of "pi" section 15 are a tunnel diode device 1 and a bias resistance 2 and the series element thereof is an inductance 3 as in the arrangement of FIG. 1.

Means are provided at terminals 4–5 for applying a frequency modulated input signal to the tunnel diode device through an appropriate impedance shown conveniently as resistance 6. As distinguished from the arrangement of FIG. 1, however, the values of resistance 2 and inductance 3 are so chosen to provide that the applied input signal causes the tunnel diode device to change from the low voltage operating region to the higher voltage operating region and the signal also causes it to change back from the higher voltage region to the low voltage region such that the average value of the output across the tunnel diode device is independent of the frequency of the input signal. For example, although the rate of the pulses of the output varies with the frequency, the pulse length varies inversely and the average value of the output remains constant.

The shunt elements of "pi" section 16 are a resistance 17 and a parallel combination of a resistance 18 and capacitance 19 while the series element thereof is a rectifying diode 20. The two "pi" sections 15 and 16 are coupled together by a suitable capacitance 21 which provides, in combination with resistance 17, an appropriate differentiating network for the output appearing across the tunnel diode device 1. Rectifying diode 20 allows only one polarity of the differentiated tunnel diode output to appear across the means for averaging the output. This averaging means is shown conveniently as the parallel combination of resistance 18 and capacitance 19. The output is taken at the terminals 7—7, which average output represents the intelligence of the applied input signal.

In the embodiment shown in FIG. 3, therefore, means, including resistance 17 and capacitance 21; diode 20; and the parallel combination of resistance 18 and capacitance 19; are coupled to tunnel diode device 1 for respectively differentiating, rectifying, and averaging the output which appears across the tunnel diode device in response to an applied frequency modulated input signal; the average output so obtained representing the intelligence of the input signal.

In operation, therefore, the valves of resistance 2 and inductance 3 are so selected with respect to the applied frequency modulated input signal and the bias means, if utilized, to provide for a tunnel diode output in which the average value thereof is independent of frequency. For example, this may be very conveniently accomplished by assuring that the pulse width of the tunnel diode device output is 50%. A typical waveform of such an output is shown in FIG. 4*a*. The waveform shown in FIG. 4*b* represents the differentiated output of the tunnel diode device. For example, the values of capacitance 21 and resistance 17 have been previously selected to produce such differentiation of the output shown in FIG. 4*a* which results, therefore, in a typical waveform such as shown in FIG. 4*b*. The diode 20 passes only one polarity of this differentiated output and the average of these represents the intelligence of the applied frequency modulated signal. The rectified differentiated output is shown in FIG. 4*c*. As shown particularly in FIG. 3, diode 20 is poled to pass only the positive excursions of the differentiated output, however, it will be understood that the average of the negative excursions may be similarly utilized to represent this intelligence.

Still greater reliability of operation of the frequency modulation detectors of this invention is provided by applying the frequency modulated input signal to the tunnel diode device only when the tunnel diode device is in its original operating region. This is provided in accordance with another aspect of this invention. FIG. 5 illustrates a schematic circuit diagram of a suitable means of this type for use with the frequency modulation detectors of this invention. In FIG. 5 there is shown a portion only of a frequency modulation detector in accordance with this embodiment of our invention including input terminals 4–5, a rectifying diode 22, tunnel diode device 1 and inductance 3 the other circuit components being as shown in either FIGS. 1 or 3 respectively. Diode 22 assures that the frequency modulated input signal at terminals 4–5 will be applied to the tunnel diode device only when the tunnel diode is in its original operating region.

In operation, with the tunnel diode device 1 in its initial operating region for example, a low voltage region corresponding to a forward voltage less than that of the tunnel diode peak current, the rectifying diode 22 is connected to provide for easy current flow therethrough. The input signal applied to the input terminals 4–5, therefore, is applied through rectifying diode 22 to tunnel diode device 1 increasing the voltage thereacross to a value in excess of that corresponding to the peak current and causing the tunnel diode device to change to its other, or higher voltage operating region with the consequent voltage change thereacross. This voltage change across the tunnel diode device reverse biases rectifying diode 22 and prevents the input signal at terminals 4–5 from being applied to tunnel diode device 1 as long as diode 22 is so reverse biased. Rectifying diode 22 will be reverse biased until such time as the tunnel diode device has been allowed by the $L/R$ time constant to return to its initial operating region. An input signal is applied to the tunnel diode device, therefore, only when the tunnel diode device is in its initial operating region.

One detector of frequency modulated signals constructed in accordance with one embodiment of this invention utilized the following parameters which are given by way of example only:

| | |
|---|---|
| Tunnel diode device 1 | General Electric Co., #IN2939 1 milliamp tunnel diode. |
| Resistance 2 | 100 ohms. |
| Inductance 3 | 100 microhenries. |
| Impedance 6 | 1000 ohm resistance. |
| Battery 8 | 1½ volts. |
| Resistance 9 | 1500 ohms (variable). |
| By-pass capacitance 10 | .01 microfarad. |

The above circuit provided effective and reliable operation from an intermediate frequency input signal of 1 megacycle with only about 5000 microvolts of an average frequency modulated signal.

A detector of frequency modulated signals constructed in accordance with another embodiment of this invention utilized the following parameters which are again given by way of example only:

| | |
|---|---|
| Tunnel diode device 1 | General Electric Co., #IN2939 1 milliamp tunnel diode. |
| Resistance 2 | 100 ohms. |
| Inductance 3 | 55 to 110 microhenries (variable). |
| Impedance 6 | 1000 ohm resistance. |
| Battery 8 | 1½ volts. |
| Resistance 9 | 1500 ohms (variable). |
| Resistance 17 | 10,000 ohms. |
| Resistance 18 | 100,000 ohms. |
| Capacitance 19 | 1000 micromicrofarads. |
| Rectifier 20 | Germanium rectifying diode. |
| Capacitance 21 | 20 micromicrofarads. |

With the above circuit parameters the tunnel diode bias was adjusted to provide for a 50% pulse width. The input signal applied through the 1000 ohm resistance 6 was an intermediate frequency signal of about 1 megacycle which resulted in about a 10% frequency modulation and provided for a greater audio output at the terminals 7—7 than is obtained from a standard intermediate frequency of 10 megacycles. Detection of frequency modulation signals was reliably and effectively provided with essentially no distortion due to amplitude modulation.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What we claim as new and desire to secure by Letters Patent of the United States is:

1. A detector of frequency modulated signals comprising: a tunnel diode device exhibiting a region of negative resistance in the forward voltage range of its current-voltage characteristic; means for applying a frequency modulated input signal to said tunnel diode device; means including a resistance and an inductance coupled to said tunnel diode device for initiating a cycle of operation for said tunnel diode device in response to said applied input signal wherein said tunnel diode device changes from one operating region to another so that the average value of the voltage output thereacross varies in accordance with the frequency of said applied input signal; and means for taking an output from said detector across said resistance representative of the intelligence of said input signal.

2. A frequency modulation detector comprising: a pi-type section including an inductance, a resistance and a tunnel diode device exhibiting a region of negative resistance in the forward voltage range of its current-voltage characteristic; means for coupling a frequency modulated input signal to said tunnel diode device, said input signal being operative to cause said tunnel diode device to change from one operating region to another to produce an output; and means coupled to said tunnel diode device for differentiating, rectifying and averaging said output respectively.

3. A frequency modulation detector comprising: a pi-type section including an inductance, a resistance, and a tunnel diode device exhibiting a region of negative resistance in the forward voltage range of its current-voltage characteristic; means for coupling a frequency modulated input signal to said tunnel diode device, said input signal being operative to cause said tunnel diode device to change from one operating region of its current-voltage characteristic to another to produce a voltage output at said tunnel diode device whose average value is independent of the frequency of said input signal; and a network coupled to said tunnel diode device including means for differentiating said output, rectifying said differentiated output and averaging the rectified output respectively to produce an audio signal.

4. A detector of frequency modualted signals comprising: a pi-type section including a resistance, an inductance and a tunnel diode device, said tunnel diode device exhibiting a region of negative resistance in the forward voltage range of its current-voltage characteristic; means for coupling a frequency modulated input signal to said tunnel diode device, cycles of said signal of only one polarity being operative to initiate a cycle of operation for said tunnel diode device wherein said tunnel diode device changes from one operating region to another and returns in accordance with the time determined by the ratio of said inductance to said resistance so that the average value of the output across said tunnel diode device varies with the frequency of said applied input signal; and output means for obtaining said average value of said tunnel diode output.

5. A frequency modulation detector comprising: a pi-type section including an inductance, a resistance, and a tunnel diode device exhibiting a negative resistance region in the low forward voltage range of its current-voltage characteristic; means for coupling a frequency modulated input signal to said tunnel diode device, one polarity portion of each cycle of said signal being operative to initiate a cycle of operation for said tunnel diode device wherein said tunnel diode device is caused to change from one operating region to another and return to produce a voltage output thereacross the average value of which varies in accordance with the frequency of said input signal, said average output appearing across said resistance; and means for taking said average output across said resistance.

6. A detector of frequency modulated signals comprising: a pi-type network including a resistance, an inductance and a tunnel diode device exhibiting a negative resistance region in the forward voltage range of its current-voltage characteristic; means for coupling a frequency modulated input signal to said tunnel diode device operative to cause a change thereof from one operating region to another so that a voltage output is produced across said tunnel diode device whose average value varies in accordance with the frequency of said applied input signal, said means allowing said input signal to be applied to said tunnel diode device only when said tunnel diode device is in its original operating region; and means for obtaining the average output across said tunnel diode device.

7. The detector of frequency modulated signals of claim 6 wherein said means for applying said frequency modulated input signal to said tunnel diode device includes a rectifying diode.

8. A detector of frequency modulated signals comprising: a pi-type section including a resistance and a tunnel diode device as the shunt elements and an inductance as the series element respectively, said tunnel diode device exhibiting a region of negative resistance in the forward voltage range of its current-voltage characteristic and said resistance having a value with respect thereto to assure that the direct current load line has only a single intersection with said characteristic; means for applying a frequency modulated input signal to said tunnel diode device, said signal being operative to cause said tunnel diode device to change from one operating region of its characteristic to another so that the average output across said tunnel diode device resulting from said change in operating regions varies in accordance with the frequency of said input signal; and means for taking the average output across said tunnel diode device.

9. A detector of frequency modulated signals comprising: a first pi-type section including a first resistance and a tunnel diode device as the shunt elements and an inductance as the series element respectively, said tunnel diode device exhibiting a region of negative resistance in the forward voltage range of its current-voltage characteristic; means for applying a frequency modulated input signal to said tunnel diode device; bias means coupled to said tunnel diode device establishing a steady state operating region for said tunnel diode device to provide a voltage output across said tunnel diode device in response to said applied input signal whose average value is independent of the frequency of said input signal; a second pi-type section including a second resistance and a parallel combination of a first capacitance and a third resistance as the shunt elements and a rectifying diode as the series element respectively; a second capacitance coupling said first and second pi-type sections, said second capacitance providing with said second resistance a differentiating network for the voltage output across said tunnel diode device; and means for obtaining the average of said differentiated output pulses of only one polarity.

10. The detector of claim 9 wherein the means for applying a frequency modulated input signal to said tunnel diode device includes further means for allowing said input signal to be applied only when said tunnel diode device is in its original operating region.

11. The detector of claim 9 wherein the means for applying a frequency modulated input signal to said tunnel diode device includes a rectifying diode for allowing said input signal to be so applied only when said tunnel diode device is in its original operating region.

12. A detector of frequency modulated signals comprising: a tunnel diode device exhibiting a region of negative resistance in the forward voltage range of its voltage-current characteristic; means for applying a frequency modulated input signal to said tunnel diode device; means including a resistance and an inductance coupled to said tunnel diode device for initiating a cycle of operation for said tunnel diode device in response to said applied input signal wherein said tunnel diode device changes from one operating region to another so that the value of the voltage thereacross varies in accordance with the frequency of said applied input signal; and means for taking an output from said detector representative of the intelligence of said input signal.

References Cited by the Examiner

UNITED STATES PATENTS

| | | | |
|---|---|---|---|
| 2,978,576 | 4/61 | Watters | 329—205 |
| 3,061,786 | 10/62 | Theriault. | |
| 3,119,936 | 1/64 | Bergman | 307—88.5 |
| 3,122,608 | 2/64 | Taylor. | |

OTHER REFERENCES

Dym-Temperature Stable Voltage Comparing, IBM bulletin, vol. 3, No. 10, March 1961 (1 sheet), p. 141.

Proceedings of I.R.E., May 1960 (pages 854–858).

ROY LAKE, *Primary Examiner.*

ARTHUR GAUSS, ALFRED L. BRODY, *Examiners.*